US006480271B1

(12) United States Patent
Cloud et al.

(10) Patent No.: US 6,480,271 B1
(45) Date of Patent: Nov. 12, 2002

(54) TRAVERSING LASER LOCATING SYSTEM

(75) Inventors: David J. Cloud, Boothwyn, PA (US); Paul DiJoseph, Secane, PA (US); Joe Tobin, Boothwyn, PA (US); Steve Temple, Chadds Ford, PA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/756,385

(22) Filed: Jan. 8, 2001

(51) Int. Cl.[7] .................. G01B 11/26; G01C 11/00; G01C 1/06; G01C 1/00
(52) U.S. Cl. ............... 356/152.1; 356/142; 356/140
(58) Field of Search ..................... 356/141.1, 138–152.3

(56) References Cited

U.S. PATENT DOCUMENTS

| | | | |
|---|---|---|---|
| 3,279,079 A | * 10/1966 | Schiler | 33/169 |
| 3,445,855 A | 5/1969 | Grant | |
| 3,603,691 A | * 9/1971 | Hamilton | 356/152 |
| 3,774,312 A | * 11/1973 | Esch | 33/174 |
| 4,355,895 A | * 10/1982 | Cairns et al. | 33/1 Q |
| 4,708,395 A | * 11/1987 | Petry et al. | 299/1.05 |
| 4,790,651 A | 12/1988 | Brown et al. | |
| 4,796,198 A | * 1/1989 | Boultinghouse et al. | 364/513 |
| 4,889,425 A | * 12/1989 | Edwards et al. | 356/152 |
| 5,007,175 A | * 4/1991 | Schwarz | 33/286 |
| 5,137,354 A | * 8/1992 | deVos et al. | 356/152 |
| 5,198,868 A | * 3/1993 | Saito et al. | 356/142 |
| 5,237,384 A | * 8/1993 | Fukunaga et al. | 299/1.05 |
| 5,337,147 A | 8/1994 | Hargreaves | |
| 5,345,687 A | 9/1994 | Matsuura et al. | |
| 5,383,026 A | 1/1995 | Mouri et al. | |
| 5,608,530 A | 3/1997 | Gates | |
| 5,617,645 A | 4/1997 | Wick et al. | |
| 5,651,600 A | * 7/1997 | Dorsey-Palmateer | 353/122 |
| 5,663,795 A | 9/1997 | Rueb | |
| 5,690,107 A | 11/1997 | Hofmann | |
| 5,691,815 A | 11/1997 | Huber et al. | |
| 5,742,385 A | * 4/1998 | Champa | 356/141.4 |
| 5,757,499 A | * 5/1998 | Eaton | 356/375 |
| 5,757,500 A | * 5/1998 | Rueb | 356/375 |
| 5,760,392 A | 6/1998 | Hisamoto et al. | |
| 5,768,137 A | * 6/1998 | Polidoro et al. | 364/474.28 |
| 5,833,762 A | * 11/1998 | Wanner et al. | 134/18 |
| 6,069,700 A | * 5/2000 | Rudnick et al. | 356/359 |
| 6,293,027 B1 | * 9/2001 | Elliott et al. | 33/546 |

OTHER PUBLICATIONS

Parker Hannifin Corporation, HLE/HZR Linear Drives, Catalog 2042/USA, pp. A1–A5.
Tracker4000, pp. 1–3.
Paul Proctor, Indoor Test Range Checks JSF Radar Signature, Catalog, Apr. 24, 2000, pp. 74–77, Aviation Week & Space Technology.

* cited by examiner

*Primary Examiner*—Thomas H. Tarcza
*Assistant Examiner*—Brian Andrea
(74) *Attorney, Agent, or Firm*—Alston & Bird LLP

(57) ABSTRACT

A system for visually pointing out locations on a three-dimensional structure such as an airframe of an aircraft includes a laser head that traverses an elongate track erected to pass through or adjacent to the structure. The laser head is traversed and stopped at various positions along the track, and from each position the laser head is calibrated by directing the laser beam onto three or more reference locations on the structure whose nominal coordinates are known in a reference coordinate system such as used in a CAD-CAM definition of the structure. The laser head is operable to determine in its own internal coordinate system the direction of the laser bean to each reference location and the distance to the reference location, and from this information a calibration is determined for relating measurements made by the laser head to the reference coordinate system. Once calibrated, the laser head is positioned along the track as needed to establish clear lines of sight to a group of work locations and is used to point out each work location at which work operations are to be performed, which can include marking the structure with indicia or attaching a hardware item at the location.

14 Claims, 2 Drawing Sheets

TRAVERSING LASER LOCATING SYSTEM

FIELD OF THE INVENTION

The invention relates to a system for visually indicating points or shapes on a structure, such as an airframe for an aircraft or the like, at which work operations are to be performed. Such work operations may include attaching a piece of hardware to the structure at the indicated point, marking the indicated point with letters or graphical information for later use by workers, or other operations. The invention relates more particularly to a system employing a laser head that projects a laser beam onto the work locations on a structure at which work operations are to be performed so that workers can mark or attach hardware at the indicated work locations.

BACKGROUND OF THE INVENTION

The assembly of an aircraft structure can be a complicated operation involving hundreds or thousands of individual work operations for attaching various pieces of hardware to the structure. It is common practice to mark the various members of an aircraft structure with markings such as lettering, stencils, or the like, so as to indicate to assembly workers the locations on the structure where various work operations are to be performed and to indicate what those work operations entail. It is generally necessary to apply the markings after the main structure is assembled, in part because it is common to paint the structure with a protective paint after it is assembled, which would obliterate any markings applied prior to assembly. Furthermore, it is advantageous for reasons related to tolerance stack-up in many cases to wait until after a structure is assembled to mark the locations of hardware attachment points or additional secondary structure. The problem then becomes how to find those locations once the structure is assembled.

Engineering drawings, whether in conventional hardcopy or digital electronic form, are difficult to generate with sufficient simplicity and dimensional detail to make them easy to interpret for the workers responsible for applying the markings or attaching the hardware to the structure. To aid workers in applying the markings and attaching hardware, laser projection systems have been developed. In a complicated structure, and particularly in a closed interior structure such as an airframe, the laser may have to be relocated numerous times in order to have a clear line of sight to all of the points on the structure at which work operations are to be performed. Each time the laser is relocated, the support for the laser must be located in a known fashion relative to the structure and the laser must be calibrated to known reference locations on the structure. The numerous set-ups would be so time-consuming on a complex structure that the use of the laser projection system would be prohibitive in cost.

SUMMARY OF THE INVENTION

The present invention addresses the above needs by providing a programmable traversing laser locating system that enables the laser to be easily relocated in a known, repeatable fashion to as many locations as required to establish clear lines of sight to all of the work locations on the structure. The system employs a laser head that travels along a track through, into, or about the structure, and a drive system operable to move the laser head along the track. The laser head includes an actuator operable to point the laser beam generated by the laser head in various directions. The drive system and actuator provide signals indicative of the position of the laser head along the track and the orientation of the laser beam, respectively, enabling the drive system and actuator to be controlled so as to position the laser head in a desired position along the track and to point the laser beam in a desired direction.

A method in accordance with a preferred embodiment of the invention includes the step of predetermining, relative to a reference coordinate system, coordinates of the work locations of the structure onto which the laser beam is to be projected and coordinates of at least three reference locations on the structure. The reference coordinate system may be, for example, an XYZ coordinate system in which a digital representation of the structure has been created, such as in a CAD-CAM system. The digital representation may include the coordinates of the reference locations and the coordinates of the work locations at which work operations are to be performed. The method further includes the step of erecting an elongate track such that the track is fixed in space and passes proximate to the structure, and mounting a laser head on the track such that the laser head is traversable along the track. The laser head is operable to emit a visible laser beam and includes an actuator for varying the direction of the laser beam. The laser head is coupled with a drive system for traversing the laser head along the track, the drive system providing feedback signals indicative of the position of the laser head along the track and the actuator providing feedback signals indicative of the direction of the laser beam relative to an internal coordinate system of the laser head. To orient the laser head relative to the structure, the drive system is operated to traverse the laser head to a position (or to more than one position) along the track having a clear line of sight to each of the reference locations and the actuator of the laser head is operated to direct the laser beam onto each of the reference locations. A distance from each reference location to the laser head is measured. Since the coordinates of the reference locations are known in the reference coordinate system, it is possible to calibrate the drive system and the actuator based on the feedback signals therefrom and the measured distances such that coordinates of the laser head and direction of the laser beam can be determined in the reference coordinate system from the feedback signals from the drive system and actuator. Once this calibration is performed, the laser beam can be pointed to any desired point in space in the reference coordinate system. Thus, the drive system and the actuator are operated to direct the laser beam onto each of the work locations on the structure.

As noted, calibrating the drive system and actuator involves measuring a distance from the laser head to each of the reference locations of the structure. Based on the measured distances and the direction of the laser beam as indicated by the signals from the actuator, coordinates of the reference locations are calculated in the coordinate system of the laser head. In general, the calculated coordinates will differ from the predetermined coordinates of the reference locations in the reference coordinate system. Thus, a transformation (e.g., a least-squares fit) between the laser head's coordinate system and the reference coordinate system is determined, enabling the laser beam to be projected onto any point on the structure whose coordinates in the reference coordinate system are known.

In one embodiment, the laser head can be a laser tracker having the capability of using laser interferometry to determine the distance to each reference location. Such laser heads project an incident laser beam onto a retroreflective target, which reflects the beam back to the laser head where it is detected by a receiver. Comparison of the incident and reflected beams enables the distance to the target to be calculated. Accordingly, where such a laser head is employed, retroreflective targets are attached to each of the reference locations on the structure during the calibration phase of the method. The laser head if desired can be a known type of laser tracker operable to automatically "acquire" each of the targets by executing a routine in which the laser beam is systematically directed in different directions, such as in progressively smaller and smaller circles, until the laser head "locks onto" the target. The laser head also can be an oscillating type operable to trace a line, curve, or perimeter on the structure. This can be useful for tracing the outline of a bracket or other piece of hardware to be attached to the structure.

The track along which the laser head is traversed and the drive system for moving the laser head can be an integral linear positioning system having a beam-like housing on which a support plate is slidably mounted, and a drive belt mounted within the housing and attached to the support plate. The laser head is mounted on the support plate. The drive belt can be driven by a servo motor providing position feedback. Of course, other types of tracks and drive systems can be employed if desired.

Preferably, the method of the invention entails predetermining positions along the track at which the laser head has a clear line of sight to reference locations and work locations on the structure. Depending on the structure, the laser head may have to be stopped in several different positions to be able to see all of the reference locations and work locations. It may also be necessary to provide more than one track each carrying a laser head. It is also desirable for the laser beam to be as close to normal to the surface of the structure as possible so that the beam spot on the structure will have good definition. Thus, the predetermined positions along the (or each) track are selected such that the laser head has a clear line of sight to one or more locations on the structure onto which the laser beam is to be projected, and such that the laser beam can be projected onto one or more work locations with an acceptably small angle between the beam and the surface normal at each work location. In many cases, a deviation of as much as 75 degrees between the beam and the surface normal can be tolerated.

Preferably, the coordinates of the reference locations and work locations are stored in an electronic storage medium, such as a hard disk, that is connected to a programmed microprocessor controller. The controller is also connected to the drive system and actuator for the laser head. The controller is programmed to operate the drive system and actuator so as to position the laser head in the corresponding position along the track for each reference and work location. Accordingly, the data stored in the storage medium preferably also includes the track position for each reference and work location. It is also advantageous for the stored data to include information about the work operation to be performed at each work location, such as a description of the marking to be applied to the structure (e.g., lettering or graphical indicia), the size, font, and color to be used for any lettering, the orientation of the marking, an identification of hardware to be attached at the work location, and/or other information considered useful. The storage medium can be a network server located remote from the structure or a dedicated storage device located where the structure is erected.

The controller preferably is also operable to calculate the transformation between the internal coordinate system of the laser head and the reference coordinate system for the structure. It is advantageous for the controller to identify any reference point whose calculated coordinates differ from the predetermined coordinates by more than a selected tolerance limit, since this may indicate a problem with the structure. The controller can also give the operator an option to disregard any such out-of-tolerance reference point(s) when calculating the transformation.

It is further preferable to connect the controller with one or more display devices, such as a CRT monitor, LED display, heads-up display, or the like, so that the information for each work location can be visually displayed. Prompts for the operator can also be displayed.

The system preferably includes an input device for the controller so that the operator can provide responses to prompts from the controller and can input information for storage in a log file on the storage medium. The input device can be, for example, a wireless remote control device in communication with the controller by infrared signals or the like and operable to make selections from a predefined user menu displayed on the display device. The menu can include selections such as "go to next point" (meaning that the work operation for the current point was successfully completed and the laser head is to illuminate the next work location in the stored list of predetermined work locations), "go to previous point", "skip to next point" (meaning that the work operation for the current point could not be performed for some reason and the laser head should skip to the next point in the list), "re-acquire reference points" (causing the laser head to automatically re-acquire the reference points and the controller to calculate a new transformation), "auto-inspect" (causing the laser head to toggle at a predefined rate through all of the work locations for the current position of the laser head), and/or other selections. The controller preferably flags in the log file each work location for which the work operation was not performed, so that workers responsible for subsequent assembly operations will readily be able to identify those locations by reviewing the log file.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
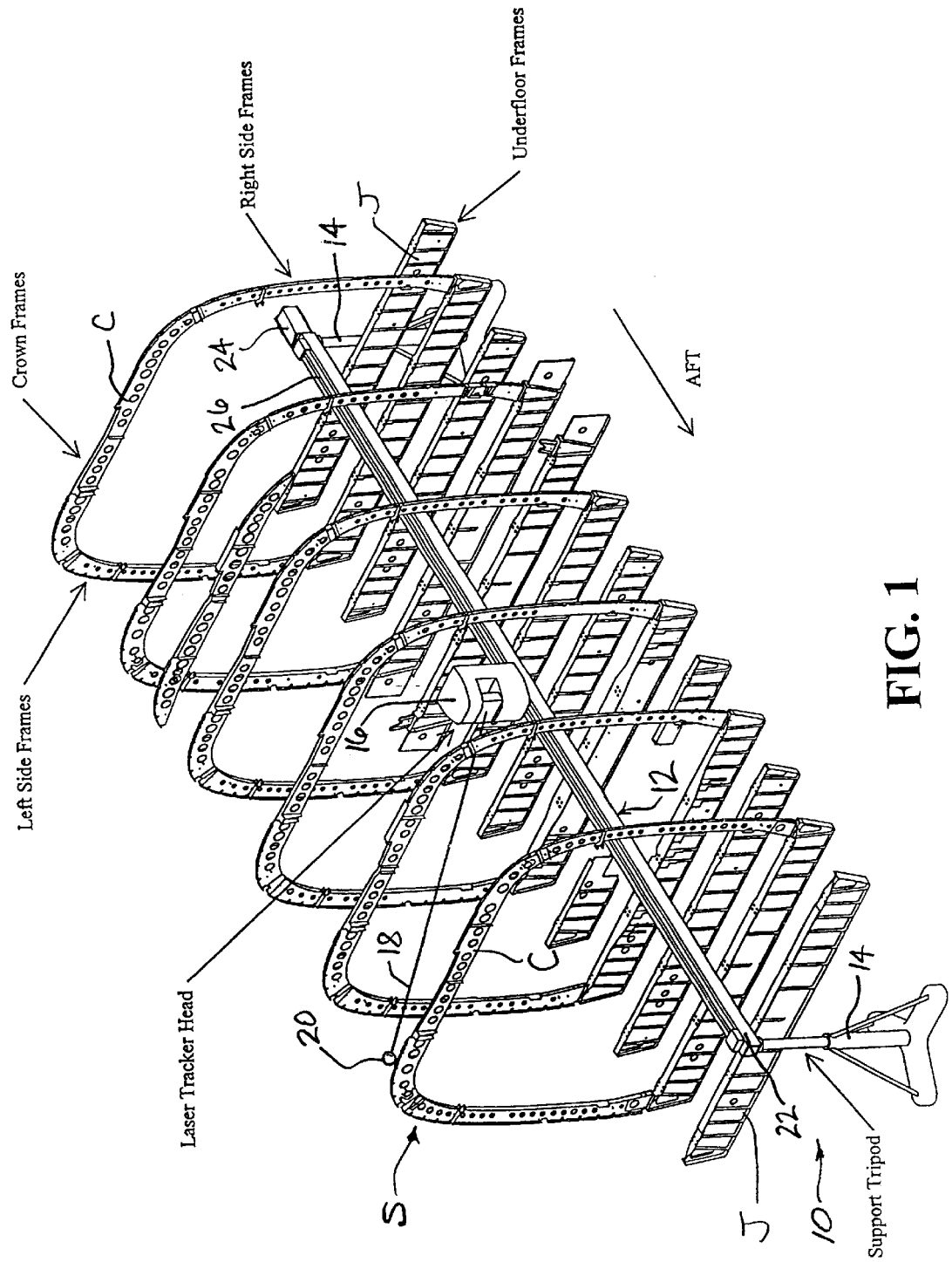
FIG. 1 is a perspective view of a traversing laser locating system in accordance with one embodiment of the invention.

FIG. 1 depicts a representative set-up of a laser location system 10 in accordance with the invention, shown in conjunction with a fuselage frame structure S for an aircraft such as a helicopter or the like. The frame structure S includes a plurality of underfloor joist members J that extend transversely relative to a longitudinal axis of the aircraft and are spaced apart along the longitudinal direction of the structure for supporting a floor (not shown) of a cabin of the aircraft. Attached to the opposite ends of some of the joist members are left-side and right-side frame members L and R, respectively, that extend upwardly from the joist members. A crown frame member C is attached between the upper ends of each set of left-side and right-side frame members. The various frame members thus define a number of longitudinally spaced hoop-shaped structures to which various other structures and components (not shown) will be attached in subsequent assembly operations. In order for the assembly workers to know where such other structures and components are to be attached, the frame members of the structure S must be marked in a suitable fashion. The laser location system 10 points out the locations at which work operations are to be performed so that the workers can either mark the structure at those points with suitable indicia or attach an item to the structure at the indicated point.

The laser location system 10 comprises a track 12 supported in a suitable fashion such that the track is stationary relative to the structure S, such as on support pillars 14 that rest upon a floor of an assembly building or other supporting surface that also supports the structure S. A laser head 16 is mounted on the track 12 so as to be traversable along the track from one end to the other end thereof. The track 12 is located relative to the structure such that for at least some of the members of the structure requiring marking or other work operation at locations thereon, there are positions along the track 12 at which the laser head 16 can be placed so that there is a clear line of sight from the laser head to such locations. Depending on the structure, it may be necessary in some cases to erect more than one track each having a traversing laser head. However, for the present description, a set-up having a single track and laser head is described; the principles described herein for a single track also apply to multiple-track set-ups.

The laser head 16 emits a visible laser beam 18 and is operable to vary the direction of the laser beam within a sector of a spherical space centered at the laser head. More particularly, the laser head 16 is operable to rotate the laser beam through a range of angular movement independently about each of two perpendicular axes. In the set-up depicted in FIG. 1, one of these axes is vertical and the other is horizontal and extends in the transverse (i.e., left-to-right) direction of the structure S. The laser head 16 includes two independently operable internal actuators (not shown) for moving mirror prisms associated with each actuator in order to change the direction of the emitted laser beam 18 about each axis. The laser head preferably includes a receiver that receives a reflected beam from a retroreflective target 20 such as a spherical mirror ball, and a controller in the laser head that continuously adjusts the direction of the emitted laser beam 18 so as to maintain the reflected beam collinear with the emitted beam. The controller is also operable to automatically find or acquire a target 20 by systematically moving the laser beam, such as in a series of circles of progressively smaller diameters, until the reflected beam is received by the receiver. The laser head preferably also includes an interferometer that measures the distance from the laser head to the retroreflective target 20 based on the beam reflected back to the receiver in the laser head. Thus, the retroreflective target 20 can be attached at any location on the structure S and the laser head can find the target 20 and measure the distance to the target. A laser head having such capabilities is described in U.S. Pat. No. 4,790,651, the disclosure of which is incorporated herein by reference.

Laser heads, also known as laser trackers, in accordance with the '651 patent are available from SMX Corporation of Kennet Square, Pa. The laser head also can be an oscillating type operable to trace a line, curve, or perimeter on the structure. This can be useful for tracing the outline of a bracket or other piece of hardware to be attached to the structure.

The track 12 preferably comprises a mechanized linear positioner such as an HLE linear drive available from the Daedal Division of Parker Hannifin Corporation located in Harrison City, Pennsylvania. This type of linear positioner includes an elongate linear beam 22 that is hollow and contains an internal toothed drive belt (not shown) that is looped about drive and guide rollers (not shown) and extends the length of the beam. A motor 24 is connected to the drive roller(s) for driving the drive belt. Alternatively, the beam can contain a traversing ball screw mechanism having a feed screw connected to the motor 24. A carriage (not shown) inside the beam is affixed to the drive belt at one location thereof, or to the traversing nut member of the ball screw mechanism, and a load attachment plate (not shown) outside the beam is attached to the carriage by a member that extends through an elongate slot 26 in one wall of the beam. The laser head 16 is mounted on the load attachment plate of the track 12. Thus, operating the motor 24 causes the laser head 16 to be moved along the track 12. The motor 24 preferably is a servo motor or the like providing position feedback signals indicative of where the laser head 16 is located along the track. It would also be possible in accordance with the present invention to use a track 12 without a motor and to manually position the laser head along the track.

The structure S generally will have been designed and assembled in accordance with a set of blueprints or electronic data files, such as CAD/CAM files, in which the configuration of each part and the overall assembly is defined in a reference coordinate system. Each location on the structure at which work operations are to be performed is defined in terms of its coordinates in the reference coordinate system. Similarly, there are readily visible reference features or locations on the structure whose locations are also defined in the reference coordinate system. For example, the reference locations may be holes, flanges, or the like, that can readily be found by a worker. In accordance with the present invention, these reference locations are used for calibrating the laser head 16 so that no matter where it is positioned along the track 12, its location in the reference coordinate system can be determined.

To this end, the procedure for calibrating the laser head 16 involves attaching retroreflective targets 20 to a plurality of reference locations on the structure whose nominal coordinates in the reference coordinate system are known. Preferably, for each position of the laser head 16 along the track 12 at which the laser head is to be positioned for pointing out the work locations requiring marking or other treatment, at least three targets 20, and more preferably at least six targets, are attached to a like number of reference locations on the structure. At each such position along the track, the laser head 16 is operated to acquire each target 20 and measure the distance from the laser head to the target. The laser head 16 also determines, in its own internal coordinate system, the direction of the laser beam 18 to each target. From the direction and distance information determined by the laser head, and the known nominal coordinates of the reference locations, a transformation is calculated (e.g., by performing a least-squares curve fit) between the reference coordinate system and the internal coordinate system of the laser head. Based on this transformation, the laser head is then able to direct the laser beam to the work locations of the structure based on their coordinates in the reference coordinate system.

Figure 2:
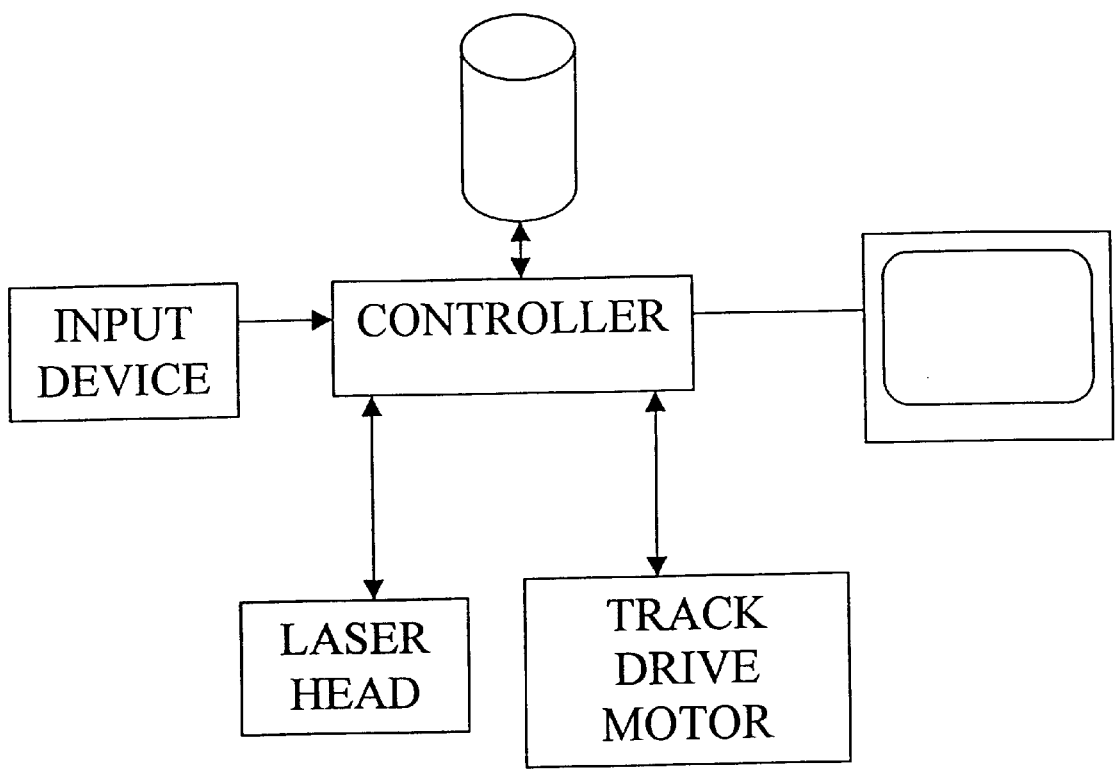
FIG. 2 is a block diagram of the system.

With reference to FIG. 2, the coordinates of the reference locations and the work locations to be pointed out by the laser head are preferably stored in an electronic data storage medium 30 such as a computer hard disk. The storage medium can be a network server located remote from the structure or a dedicated storage device located where the structure is erected. The storage medium is in communication with a controller 32 that is also connected to the drive motor 24 of the track 12 and to the laser head 16. The controller is programmed to reposition the laser head 16 along the track as needed and to operate the laser head 16 in the calibration and pointing modes. The calibration mode has been described above. In the pointing mode, the laser head 16 is positioned at various positions along the track 12 and at each position the laser head is operated to direct the laser beam to each of a plurality of work locations based on the stored coordinates of those locations. Preferably, a position along the track is predetermined for each group of work locations such that the laser head has a clear line of sight to all of the work locations in the group, and such that the angle between the laser beam and the normal to the surface of the structure onto which the beam is directed at each work location does not exceed a certain value, such as about 75°. These predetermined positions along the track preferably are stored in the storage medium 30 and each stored work location in the storage medium is associated with one of the predetermined positions along the track. The controller 32 preferably steps through the work locations in an orderly fashion so as to minimize the number of times the laser head must be repositioned along the track. Preferably, each time the laser head is moved to a new position along the track, a verification check is made in which the laser head is used to determine the position of at least one reference location on the structure to verify that the laser head is functioning properly. If the verification check fails, as indicated by an excessive difference between the measured position of the reference location and the nominal position thereof, the laser head is re-calibrated and a new transformation between the internal coordinate system of the laser head and the reference coordinate system is calculated.

It is advantageous for the data stored in the storage medium 30 to include information about the work operation to be performed at each work location, such as a description of the marking to be applied to the structure (e.g., lettering or graphical indicia), the size, font, and color to be used for any lettering, the orientation of the marking, an identification of hardware to be attached at the work location, and/or other information considered useful.

During the calibration phase, or any time a re-calibration is performed, the controller 32 calculates the transformation between the internal coordinate system of the laser head and the reference coordinate system for the structure. When only three reference locations are acquired and measured by the laser head from a given position along the track, a unique transformation can be calculated. However, when more than three reference locations are acquired and measured by the laser head from a given position along the track, it will be recognized that the problem of finding a transformation is over-defined; i.e., only three such points are needed to calculate a transformation, and depending on which three points are used, different solutions can be found that in general will not agree with one another. Accordingly, a preferred process for calculating the transformation is to perform a least-squares curve fit on all of the acquired points. The controller preferably then compares the nominal predetermined coordinates of each reference location with calculated coordinates determined from the curve fit and the laser head measurement data. It is advantageous for the controller to identify any reference point whose calculated coordinates differ from the predetermined coordinates by more than a selected tolerance limit, since this may indicate a problem with the structure. The controller can also give the operator an option to disregard any such out-of-tolerance reference point(s) when calculating the transformation.

It is further preferable to connect the controller 32 with one or more display devices 34, such as a CRT monitor, LED display, heads-up display, or the like, so that the information for each work location can be visually displayed. Prompts for the operator can also be displayed.

The system preferably includes an input device 36 for the controller so that the operator can provide responses to prompts from the controller and can input information for storage in a log file on the storage medium 30. The input device 36 can be, for example, a wireless remote control device in communication with the controller 32 by infrared or radio-frequency signals or the like and operable to make selections from a predefined user menu displayed on the display device 34. The menu can include alternative actions to be performed such as "go to next point" (meaning that the work operation for the current point was successfully completed and the laser head is to illuminate the next work location in the stored list of predetermined work locations), "go to previous point", "skip to next point" (meaning that the work operation for the current point could not be performed for some reason and the laser head should skip to the next point in the list), "re-acquire reference points" (causing the laser head to automatically re-acquire the reference points and the controller to calculate a new transformation), "auto-inspect" (causing the laser head to toggle at a predefined rate through all of the work locations for the current position of the laser head), and/or other selections. The controller 32 preferably flags in the log file each work location for which the work operation was not performed, so that workers responsible for subsequent assembly operations will readily be able to identify those locations by reviewing the log file.

In addition to creating the log file, the controller 32 can also be programmed to produce various types of reports of the measured and calculated data for various purposes, such as for diagnosing causes of problems with the structure S.

From the foregoing, it will be appreciated that the invention provides a unique solution to the problem of how to indicate to assembly workers assembling a complex three-dimensional structure the locations on the structure where work operations are to be performed. The invention provides advantages over prior fixed laser pointer systems that have to be repeatedly repositioned manually by workers and re-calibrated each time they are repositioned.

Many modifications and other embodiments of the invention will come to mind to one skilled in the art to which this invention pertains having the benefit of the teachings presented in the foregoing descriptions and the associated drawings. For example, although the invention has been explained by reference to a preferred embodiment in which the track 12 defines a linear path along which the laser head 16 is traversed, there is nothing in principle that would prevent the invention from being practiced with a non-linear track. Furthermore, as already noted, more than one track each carrying a traversing laser head could be used.

Although the laser head 16 described herein is operable to measure the distance to a reference location by interferometry, other methods for measuring the distance can be used. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for projecting a laser beam onto work locations on surfaces of a three-dimensional structure at which work operations are to be performed on the structure, the method comprising:

predetermining, relative to a reference coordinate system, coordinates of said work locations onto which the laser beam is to be projected and coordinates of at least three reference locations on the structure;

erecting an elongate track such that the track is fixed in space and passes proximate to the structure;

mounting a laser head on the track such that the laser head is traversable along the track, the laser head being operable to emit a visible laser beam and having an actuator operable to vary the direction of the laser beam, the actuator providing feedback signals indicative of the direction of the laser beam relative to an internal coordinate system of the laser head;

traversing the laser head to a position along the track having a clear line of sight to each of the reference locations and operating the actuator to direct the laser beam onto each of the reference locations, measuring a distance from each reference location to the laser head and determining a direction of the laser beam to each reference location in the internal coordinate system of the laser head, and determining a transformation between the internal coordinate system and the reference coordinate system; and operating the actuator of the laser head to direct the laser beam onto each of said work locations on the structure based on the predetermined coordinates of each work location and the transformation.

2. The method of claim 1, further comprising predetermining, for each work location, a corresponding position along the track at which the line of sight to said work location has a smaller deviation from a surface normal passing through said work location than for other positions along the track, and wherein directing the laser beam onto each work location comprises placing the laser head in the position along the track corresponding to said work location.

3. The method of claim 1, wherein the structure comprises an open framework defining an interior space therein, and wherein the track is erected to pass through the interior space.

4. The method of claim 1, wherein the laser head is coupled with a drive system for traversing the laser head along the track, the drive system providing feedback signals indicative of the position of the laser head along the track, and wherein the drive system and actuator are calibrated by:

attaching a reflective target to the structure at each reference location and directing the laser beam onto the target at each reference location such that the laser beam is reflected from the target back to the laser head, the laser head receiving the reflected beam and determining the distance from the laser head to the target at each reference location;

determining coordinates of each reference location in the laser head's internal coordinate system based on the measured distance and the direction of the laser beam as indicated by the actuator feedback signal; and calculating the transformation between the internal coordinate system of the laser head and the reference coordinate system.

5. The method of claim 4, wherein calibrating the drive system and actuator further comprises placing the laser head in each of at least two positions along the track and directing the laser beam onto reflective targets at reference locations of the structure from each of the positions along the track.

6. The method of claim 5, wherein each time the laser head is moved to a new position along the track, a verification check is made in which the laser head is used to determine the position of at least one reference location on the structure to verify that the laser head is functioning properly.

7. The method of claim 6, wherein if the verification check fails, the laser head is re-calibrated and a new transformation between the internal coordinate system of the laser head and the reference coordinate system is calculated.

8. The method of claim 1, further comprising storing the coordinates of said work locations and reference locations in an electronic storage medium, and coupling the electronic storage medium and the actuator to a controller operable to control the actuator based on the feedback signals therefrom so as to direct the laser beam onto said work locations based on the coordinates stored in the electronic storage medium.

9. The method of claim 8, further comprising storing additional data associated with each work location.

10. The method of claim 9, wherein storing additional data for each work location comprises storing at least information indicating what work operation is to be performed at the work location.

11. The method of claim 10, further comprising displaying the coordinates and the additional data for each work location on at least one visual display contemporaneously with the laser head directing the laser beam onto the work location whose coordinates and additional data are displayed.

12. The method of claim 11, further comprising storing an electronic log file in the storage medium containing at least an identification of any work location for which the work operation was not performed.

13. The method of claim 11, wherein the controller displays on the at least one visual display a user menu of alternative actions to be performed, and further comprising inputting a selected one of the actions into the controller, the controller then causing the selected action to be performed.

14. The method of claim 13, wherein a wireless remote control device in communication with the controller is used for inputting the selected action into the controller.

* * * * *